UNITED STATES PATENT OFFICE 2,285,093

MIXTURE OF MATERIALS AND METHOD OF MAKING

Vaman R. Kokatnur, Beechhurst, N. Y.

No Drawing. Application October 28, 1939,
Serial No. 301,732

7 Claims. (Cl. 252—1)

This invention relates to mixtures of materials and the method of making the said mixtures. The invention relates, particularly, to the recovery by evaporation of two or more non-volatile materials from a solution, in such manner as to obtain a relatively uniform composition of recovered product from first to last of the evaporation.

It is common practice to separate dissolved substances from solution by the evaporation of the solvent in which they are initially dissolved, as, for example, by the evaporation of a solution containing both sodium nitrate and potassium nitrate. When such a solution is evaporated, there is first obtained crystals of the nitrate which first reaches saturation in the solution being evaporated. Except for some occlusion or surface wetting by the mother liquor, the substance first separating is substantially free from the other nitrate. When, however, the evaporation proceeds to the point at which both nitrates are present in saturation proportions, then both nitrates will separate simultaneously. The two nitrates thus form a mixture of crystals that may be distinguished from each other, the sodium nitrate occurring in one type of crystal and the potassium nitrate in an adjacent crystal of different kind.

In such a usual evaporation process, the temperature of boiling is influenced greatly by the concentration of the dissolved materials and does not become constant until saturation is reached for all of the separate substances present in the solution.

It is an object of the invention to provide a method for decreasing the variation in composition of the mixture of non-volatile substances recovered in different stages of the evaporation process. Another object is to provide a method of recovering two or more materials, especially crystalloids, from the solution in the form of particles each of which contains the several materials in proportions similar to those in which the materials occur in the solution. Other objects and advantages of the invention will appear from the detailed description that follows.

Briefly stated, the invention comprises vigorously agitating a solution of two or more substantially non-volatile materials, in a selected solvent, with a liquid that is immiscible with the said solution and practically a non-solvent for the dissolved substances, subjecting the resulting mixture to evaporation to remove said solvent, and then separating the recovered materials from the remaining immiscible liquid. In the preferred embodiment, the invention comprises the use of an immiscible liquid that is volatile and, suitably, of a somewhat higher boiling point than the solvent in the said solution, the higher boiling point serving to give a satisfactory ratio of solvent to liquid evaporated and promoting quick evaporation of solvent from individual droplets of the solution dispersed in the said liquid.

The materials and basic method to which the present method may be applied are those described in my application for U. S. Patent Serial No. 43,057, filed October 1, 1935, for Process of removing water from solutions, with the modification that the present invention requires the use of a solution of at least two substances each in substantial concentration, the said solution being treated as described in my said prior application in connection with the evaporation of a solution of one material.

The substances which are to be recovered from the solution are suitably non-volatile materials, such as common salts, fixed alkalis, including the alkali metal hydroxides and carbonates, or other chemicals that are not inter-reactive with each other. For some purposes, one or more of the said substances may be substantially insoluble and used in the form of a suspension in the solution as will appear later.

The solvent present in the solution which is to be evaporated ordinarily is water. Other solvents, however, may be used, as, for example, those consisting largely or wholly of alcohol, ether, acetone, or the like.

The immiscible liquid selected, as indicated above, is preferably volatile at a temperature somewhat but not too much above the boiling point of the solvent in the solution. Also, the immiscible liquid should be substantially a non-solvent for the dissolved substances that are to be recovered from the solution and chemically inert thereto. Examples of immiscible liquids that may be used in the evaporation of water solutions are the higher boiling fraction of gasoline, kerosene, toluene, xylene, or the like. With other solvents than water present in the solution to be evaporated, the immiscible liquid selected should meet the general requirements stated above. The liquid may be selected from one of those listed above, or it may be ligroin, benzene, monochlorbenzene, ethylene dichloride, or the like. When the solvent and dissolved materials are insoluble in water, water is very satisfactory as the immiscible liquid.

The invention is illustrated in greater detail in onnection with the following specific examples.

An aqueous solution is made of approximately 15 parts of sodium carbonate and 350 parts of sodium hydroxide, the water being used in proportion in excess of the amount required to dissolve the two substances. Thus, there may be used, for instance, 200 to 1,000 parts of warm water, proportions here and elsewhere herein being expressed as parts by weight. To the above solution there is added a kerosene of boiling range about 350° F. to 480° F., the proportion of kerosene being approximately 2 parts or more for each 1 part of the solution.

The kerosene and solution are formed into a mixture or dispersion by vigorous agitation. As a result, small droplets of the solution are caused to be suspended as the discontinuous phase in the kerosene constituting the continuous phase.

The resulting mixture is then treated to cause evaporation of water. It is heated to an elevated temperature causing boiling, the temperature being somewhat below the boiling point of either the kerosene or the aqueous solution separately, inasmuch as boiling begins when the partial pressures of the kerosene and water jointly slightly exceed the external pressure.

The heating is continued, with the removal of water vapor and kerosene vapor, until the sodium hydroxide and sodium carbonate, initially dissolved, are converted to substantially anhydrous form. At this time there remains a suspension of recovered particles of hydroxide and carbonate in immiscible liquid. If the proportion of such liquid originally supplied is not adequate to leave a portion of the liquid behind when substantially all water has been removed, then more of the said liquid is added or the liquid distilled with the water vapor is separated in an external system and the non-aqueous layer returned to the evaporator, either continuously or at intervals.

It is to be understood that vigorous agitation should be continued during the entire period of the conversion of the dissolved materials to substantially anhydrous form and that the latter term includes finely divided solid substances holding water in the form of hydrates, particularly the lower hydrates.

The separation of the recovered substantially anhydrous materials from the remaining immiscible liquid in the evaporator is effected in any convenient manner, as, for instance, by centrifuging or filtering the product from the evaporator. Also, any remaining liquid adhering to the centrifuged or filtered crystals may be removed by evaporation, at a temperature near the boiling point of the liquid, or by washing with a volatile solvent for the said liquid, which solvent is then removed by evaporation. Among solvents that may be used for washing the recovered materials are ethylene dichloride, cleaners' naphtha, and benzene.

During the evaporation described, small droplets of the aqueous carbonate and hydroxide solution dispersed in the kerosene are dehydrated as units. Furthermore, the kerosene surrounds or wets the product of such evaporation and minimizes or prevents the solution of a recovered substance in adjacent portions of the solution in which the substance may be present in less than the saturation proportion.

As a result, there is obtained a rather uniform composition of recovered product at all stages of the evaporation. Furthermore, the individual particles recovered from the solution contain both of the dissolved materials, in an intimate relationship which is quite different from the mixture of separate crystals of the two kinds ordinarily obtained.

In place of the carbonate and hydroxide of the above example, there may be used in the solution other pairs of substantially non-volatile substances. Thus, there may be used mixtures containing substantial concentrations, 5 to 10 per cent or more, of each of the following pairs of substances: sodium hydroxide and potassium hydroxide; sodium hydroxide and sodium silicate; sodium hydroxide and tertiary sodium phosphate; sodium hydroxide and sodium sulfite or sulfide; and sodium hydroxide and a sodium or potassium soap.

The products obtained by the dehydration of the pairs of substances described may be used for those purposes for which the two substances are at present used in the form of ordinary mixtures or in the form of separate additions.

The products obtained have the advantage of close association of the two non-volatile substances, a particularly low melting point, and, ordinarily, a predominance of the physical properties of the more soluble of the two substances. Another result sometimes obtained by following my method is an unpredictable effect upon the color of a non-volatile material recovered from the solution. Sodium sulfide, when recovered along with sodium hydroxide, undergoes a change of color which seems to be much more pronounced than the simple dilution by a white material; there is a change in the quality as well as the intensity of the color.

For convenience, I refer to the products as alloy chemicals.

In addition, the method described may be applied to the formation of an intimate composition of a substantially non-volatile suspended material and a dissolved substance. For instance, one of the compounds of the pairs given above may be replaced, for some purposes, by an insoluble substance which is suspended in the solution of the other compound. For example, lime may be suspended in an aqueous solution of sodium hydroxide and the solution subjected to evaporation in the manner described above. When such substitution is made, then there is produced in effect an improved soda lime composition, which is useful for purposes for which soda lime is now employed.

Likewise, calcium sulphate may be suspended in a water solution of calcium chloride, or sand in an aqueous solution of sodium hydroxide, the suspension in either case being then treated with immiscible liquid and heated to evaporate the water, all as described previously.

The sand and sodium hydroxide composition, after removal of the water, may be fused to form sodium silicate. This fusion is facilitated by the close association of the sand and the sodium hydroxide.

In such products, the least soluble material usually forms a central portion or nucleus around which the more soluble material is collected.

The evaporation of the solvent from the solution may be effected under reduced pressure, say, in a partial vacuum corresponding to an actual pressure of 2 to 15 inches of mercury.

Also, the evaporation of the solvent from the solution may be effected in a continuous operation. Thus, the solution of the non-volatile materials may be passed downwardly through a rectifying column, in intimate contact with vapors of the immiscible liquid which are heated and caused to rise through the column, as by being distilled from a pot placed below and in communication with the lower end of the column. The resulting mixture of vapor of solvent and immiscible liquid which issues from the top of the column is condensed and the condensate passed to a separator or decanter. Here the condensate is separated under the influence of gravity into an upper non-aqueous and a lower aqueous layer. The upper layer may be returned to the evaporator system, preferably to the top of the rectifying column. Likewise, fresh portions of the solution of the two non-volatile materials may be supplied continuously to the system, as, for instance, at a position near the top of the column.

Regardless of the specific solvent used in the method illustrated above, the non-volatile materials recovered from the solution are substantially desolvenated.

While the invention has been described in connection with the making of intimate mixtures of pairs of chemicals, it should be understood that the process may be so modified as to produce such mixtures containing three or more substances. For this purpose, the solutions of pairs of chemicals referred to above are substituted by solutions containing three, four, five, or as many as desired in the finished dewatered product. Some of these substances as used may be suspended in a solution of the other substance or substances.

It will be understood that "non-volatile" is intended to mean having only little or no vapor pressure at the temperature at which evaporation is effected in the method described.

It will be understood, also, that the details given are for the purpose of illustration, not restriction, and that variations within the spirit of the invention are intended to be included in the scope of the appended claims.

I claim:

1. In making a mixture of two inorganic water-soluble crystalloid materials, the method which comprises forming a solution of the two materials in water, dispersing the solution in a liquid that is volatile at the temperature of boiling of the solution, immiscible therewith, and substantially a non-solvent for the said materials, and then evaporating said liquid and water from the dispersion.

2. In making a mixture of two inorganic crystalloid materials, the method which comprises forming a solution of the two materials in a volatile solvent, emulsifying the solution as the discontinuous phase in a liquid that is volatile at the temperature of boiling of the solution, immiscible therewith, and substantially a non-solvent for the said materials, and then evaporating said solvent and liquid from the emulsion.

3. In making a mixture of two inorganic water-soluble crystalloid materials, the method which comprises forming a solution of the two materials in water, dispersing the solution in a liquid hydrocarbon that is volatile at the temperature of boiling of the solution, immiscible therewith, and substantially a non-solvent for the said materials, then evaporating water and a portion only of the immiscible liquid, so that the said materials are separated as particles suspended in the remaining portion of the said liquid, and then separating the said particles from the liquid.

4. The method of claim 3, the said liquid having a boiling point somewhat above that of the solvent and the evaporation being effected by boiling.

5. In separating two non-volatile crystalloid materials from an aqueous solution, the method which comprises agitating the solution of the two materials with a volatile liquid hydrocarbon that is immiscible with water and substantially a non-solvent for the said materials, heating the resulting mixture to an elevated temperature adapted to cause boiling and evaporation, and continuing the agitation and evaporation until the said materials are separated from the solution.

6. The method of claim 1, the evaporation being effected under reduced pressure.

7. The method described in claim 1, the dispersing of the said solution in the immiscible liquid and the evaporation of the liquid and water being effected by passing the solution downwardly through a rectifying column, passing upwardly through the column heated vapor of the said liquid that is immiscible with the solution and substantially a non-solvent for the said materials, so as to cause refluxing in the column, dispersion of the said solution in the said liquid, and evaporation of the water from the solution, withdrawing water vapor from the top of the column, and separating the said materials in practically anhydrous form from the mixture issuing from the bottom of the column.

VAMAN R. KOKATNUR.